(12) United States Patent
Lemke et al.

(10) Patent No.: US 10,497,918 B2
(45) Date of Patent: Dec. 3, 2019

(54) DEVICE AND METHOD FOR CONNECTING BATTERY CELLS AS WELL AS BATTERY PACK, BATTERY MODULE AND VEHICLE

(71) Applicant: Robert Bosch GmbH, Stuttgart (DE)

(72) Inventors: Andreas Lemke, Stuttgart (DE); Thomas Kretschmar, Zapfendorf (DE); Alfons Doerr, Stuttgart (DE); Davide Bossi, Ludwigsburg (DE); Martin Gerlach, Strullendorf (DE); Gerhard Schubert, Strullendorf (DE); Stefan Baumann, Altenriet (DE)

(73) Assignee: Robert Bosch GmbH, Stuttgart (DE)

( * ) Notice: Subject to any disclaimer, the term of this patent is extended or adjusted under 35 U.S.C. 154(b) by 429 days.

(21) Appl. No.: 15/169,883

(22) Filed: Jun. 1, 2016

(65) Prior Publication Data

US 2016/0351883 A1 Dec. 1, 2016

(30) Foreign Application Priority Data

Jun. 1, 2015 (DE) .......................... 10 2015 210 035

(51) Int. Cl.
*H01M 2/20* (2006.01)
*H01M 2/12* (2006.01)

(52) U.S. Cl.
CPC ............. *H01M 2/206* (2013.01); *H01M 2/12* (2013.01); *H01M 2220/20* (2013.01)

(58) Field of Classification Search
None
See application file for complete search history.

(56) References Cited

U.S. PATENT DOCUMENTS

| 5,420,377 A * | 5/1995 | Bresin | H01M 2/1022 |
| | | | 174/254 |
| 8,361,646 B2 * | 1/2013 | Ferber, Jr. | H01L 31/0504 |
| | | | 429/158 |
| 2006/0177734 A1 * | 8/2006 | Yao | H01M 2/202 |
| | | | 429/160 |
| 2006/0267545 A1 * | 11/2006 | Lee | H01M 2/1061 |
| | | | 320/106 |
| 2009/0208837 A1 * | 8/2009 | Lin | H01M 6/425 |
| | | | 429/158 |
| 2011/0097618 A1 | 4/2011 | Hauck et al. | |
| 2012/0114993 A1 * | 5/2012 | Park | H01M 2/1072 |
| | | | 429/88 |
| 2012/0121950 A1 * | 5/2012 | Lim | H01M 2/1211 |
| | | | 429/88 |
| 2012/0321936 A1 * | 12/2012 | Song | H01M 2/105 |
| | | | 429/159 |

(Continued)

FOREIGN PATENT DOCUMENTS

| CN | 104377333 A * | 2/2015 | ............ H01M 2/206 |
| DE | 102009050315 | 4/2011 | |

(Continued)

*Primary Examiner* — Maria Laios
(74) *Attorney, Agent, or Firm* — Michael Best & Friedrich LLP

(57) ABSTRACT

A device (10; 10') for connecting battery cells (30), characterized by: a multiplicity of cell connectors (14) for electrically connecting terminals (36) of the battery cells (30), and a carrier (12; 12') for mechanically connecting the cell connectors (14) to one another.

15 Claims, 3 Drawing Sheets

(56) References Cited

U.S. PATENT DOCUMENTS

2013/0302651 A1* 11/2013 Kim .................. H05K 1/148
                                                                429/7
2014/0079982 A1    3/2014 Laderer et al.
2016/0301059 A1* 10/2016 Lu .................... H01M 2/206

FOREIGN PATENT DOCUMENTS

| DE | 102011076889 | 12/2012 | | |
|----|--------------|---------|---|---|
| DE | 102011085467 | 5/2013 | | |
| DE | 102012223812 | 6/2014 | | |
| WO | WO-2015101267 A1 * | 7/2015 | ............ | H01M 2/206 |

* cited by examiner

DEVICE AND METHOD FOR CONNECTING BATTERY CELLS AS WELL AS BATTERY PACK, BATTERY MODULE AND VEHICLE

BACKGROUND OF THE INVENTION

The invention is based on a device or a method for connecting battery cells. The subject matter of the invention also comprises a battery pack, battery module and vehicle.

DE 10 2012 223 812 A1 discloses a battery cell which is surrounded by a cell housing and has at least one cell terminal for making electrical contact with the battery cell, wherein the cell terminal is connected to an electrode of the battery cell, and a region of the cell terminal projects with a free end out of the cell housing, wherein the region has a first section which extends from the cell housing, a second section which extends up to the free end, and a third section which connects the first section to the second section, wherein the third section is embodied in such a way that the second section is arranged, in an elastically restoring fashion on the first section above the third section. In addition, a cell connector for making electrically conductive contact with cell terminals of these battery cells is known, wherein the cell connector has a multiplicity of contact-forming points for forming electrically conductive contact with the cell terminals, at least two contact-forming points of which are connected to one another to form an electrically conductive connection, and wherein at least two electrically conductive connections are connected to one another in an electrically insulated fashion by means of an insulating element. In addition, a battery with at least two of these battery cells is known which are connected to one another in an electrically conductive fashion by means of cell connectors, wherein the cell connectors are connected to the cell terminals by means of a clinching method.

DE 10 2009 050 315 A1 discloses a connecting device, wherein at least two cell connectors are integrally connected to one another in an assembled state of the connecting device after the cutting of the cell connectors out of a starting material, in order to provide the connecting device for the electrically conductive connection of a plurality of cell terminals of electrochemical cells of an electrochemical device, comprising two or more cell connectors for the electrically connective connection of, in each case, two cell terminals of different electrochemical cells to one another, which connecting device permits simple and rapid mounting of the cell connectors on the electrochemical cells.

DE 10 2011 076 889 A1 discloses a cell contact-forming system, wherein a cover for an electrochemical device which comprises a plurality of electrochemical cells is provided, which cover comprises a carrier element, on which at least one cell connector for the electrically conductive connection of a first cell terminal of a first electrochemical cell and of a second cell terminal of a second electrochemical cell is arranged, and a cover element for covering the at least one cell connector, wherein the cover element comprises a covering film, in order to provide the cell contact-forming system for an electrochemical device, which cell contact-forming system has a reduced weight and nevertheless has a high protection against damages.

DE 10 2011 085 467 A1 discloses an electrochemical device, comprising at least one electrochemical cell having a first cell terminal, a second electrochemical cell having a second cell terminal and at least one cell connector for the electrically conductive connection of the first cell terminal and of the second cell terminal, wherein at least one of the cell terminals has at least one side face on which, in the mounted state, an assigned lateral edge face of the cell connector bears essentially without a gap, wherein the side face of the cell terminal and the assigned lateral edge face of the cell connector are connected to one another in a materially joined fashion in the mounted state, in order easily to produce, in the electrochemical device, a secure connection, which conducts electricity well, between the cell connector and the cell terminals which are connected thereto.

SUMMARY OF THE INVENTION

The device and the method according to the invention have the advantage that an integrated cell connector is provided. As a result, the electrical connection of battery cells can be simplified. Furthermore, assemblies, for example battery covers, which can comprise a multiplicity of components, and/or components, for example attachment elements such as screws, can be dispensed with. Therefore, the weight and/or volume of a battery pack and/or battery module can be reduced. Furthermore, working steps during the manufacture of the battery pack and/or battery module, for example positioning of the cell connectors on the terminals, can be simplified or reduced. Therefore, costs such as manufacturing costs and operating costs can be reduced.

If the cell connectors comprise metal, aluminum or copper, this has the advantage that an electrical resistance of the cell connectors can be reduced and an electrical conductivity of the cell connectors can be increased. Furthermore, the material of the cell connectors can be adapted to the material of the terminals. As a result, corrosion or electrochemical corrosion owing to a corrosion element can be avoided.

If the cell connectors are embodied in the manner of a ribbon, in the manner of a plate, in the manner of a film, in the manner of a mesh, in the manner of a network or in the shape of a strip, this has the advantage that the ability to shape the cell connectors can be improved. As a result, the processability thereof can be increased and/or the manufacture of the device can be facilitated.

If the cell connectors have a thickness of 0.01 mm to 8 mm, of 0.1 mm to 0.8 mm or 0.5 mm, this has the advantage that the ability to shape the cell connectors can be improved further.

If the cell connectors are embodied in a flexible fashion, this has the advantage that a force effect on or an application of force to the terminals can be reduced or avoided. As a result, corresponding damage to the battery cells can be prevented. The service life and reliability of the battery cells can therefore be increased.

If the cell connectors are arranged along the carrier, this has the advantage that a multiplicity of battery cells of the same type can be connected to form a battery pack or battery module.

If the cell connectors are attached to the carrier, this has the advantage that the size of the carrier and therefore its size and its weight can be reduced. Furthermore, an overall height of the device can be reduced. In this context, a connecting line between the cell connectors and the carrier can be increased, for example, by means of a wavy line or zigzag line. The connection between the cell connectors and the carrier can therefore be strengthened.

If the cell connectors are attached on the carrier, this has the advantage that a connecting area between the cell connectors and the carrier can be enlarged. The connection between the cell connectors and the carrier can therefore be strengthened further. Furthermore, the cell connectors can be covered and protected by the carrier. The safety can therefore be increased.

If the carrier comprises plastic, this has the advantage that electrical insulation between the cell connectors can be achieved. Furthermore, the carrier can be connected, for example, by means of integral injection molding and/or injection molding to the cell connectors. Its processability can therefore be increased and/or the manufacture of the device can be facilitated.

If the carrier is embodied in the manner of a ribbon, in the manner of a film or in the shape of a strip, this has the advantage that the ability to shape the carrier can be improved. Its processability can therefore be increased and/or the manufacture of the device can be facilitated.

If the carrier has a thickness of 0.01 mm to 8 mm, or 0.1 mm to 0.8 mm or 0.5 mm, this has the advantage that the ability to shape the carrier can be improved further.

If the carrier is embodied in a flexible fashion, this has the advantage that a force effect on or an application of force to the terminals can be reduced or avoided. As a result, corresponding damage to the battery cells can be prevented. The service life and reliability of the battery cells can therefore be increased.

If the device is embodied as a composite material, comprising a carrier section and a connector section or a multiplicity of connector sections, this has the advantage that its manufacture can be simplified further. For example, the composite material can be provided as material sold by the meter or material in a continuous form or material in a quasi-continuous form such as rolled material. In this context, the connector section or the connector sections can be pre-fitted to the cell connectors. For this purpose, the connector section or the connector sections can be divided into the cell connectors by cutting or punching, for example. As a result, the device can be adapted in each case to the prescriptions or requirements of the battery cells.

If the carrier comprises a multiplicity of openings for degassing the battery cells, this has the advantage that the degassing of the battery cells can be improved in a hazardous situation. In this context, the openings can be cut or punched out of the carrier. In this context, a position of the openings preferably corresponds to a position of openings or burst valves in the battery cells.

If the device also comprises a multiplicity of lines for detecting voltage measured values or current measured values of the battery cells, this has the advantage that monitoring of the battery cells can be simplified. If the lines are arranged in the carrier, this has the advantage that the lines are integrated. The design of the device can therefore be improved.

If the device also comprises a multiplicity of sensors such as temperature sensors for detecting measured values such as temperature measured values of the battery cell, this has the advantage that the monitoring of the battery cells can be improved. If the sensors are arranged in the carrier, this has the advantage that the sensors are integrated. The design of the device can therefore be improved further.

If the device also comprises a degassing duct which is connected to the multiplicity of openings, in order to degas the battery cells, this has the advantage that the degassing of the battery cells can be improved further in the event of a hazard. If the degassing duct is formed in the carrier, this has the advantage that the degassing duct is integrated. The design of the device can therefore be improved once more.

The vehicle can be embodied, for example, as a motor vehicle such as an electric motor vehicle, hybrid vehicle, plug-in hybrid vehicle, electric bike (electro-bike, e-bike) or electric bicycle (pedal electric cycle, Pedelec), or water crafts such as an electro boat or submarine boat, aircraft or space craft.

If the terminals are connected to the cell connectors by means of soldering, welding, laser welding, ultrasonic welding or resistance welding, the number of components such as attachment elements can be reduced further. Furthermore, the working steps during the manufacture can be simplified further.

BRIEF DESCRIPTION OF THE DRAWINGS

Exemplary embodiments of the invention are illustrated in the drawing and explained in more detail in the following description.

DETAILED DESCRIPTION

Figure 1:
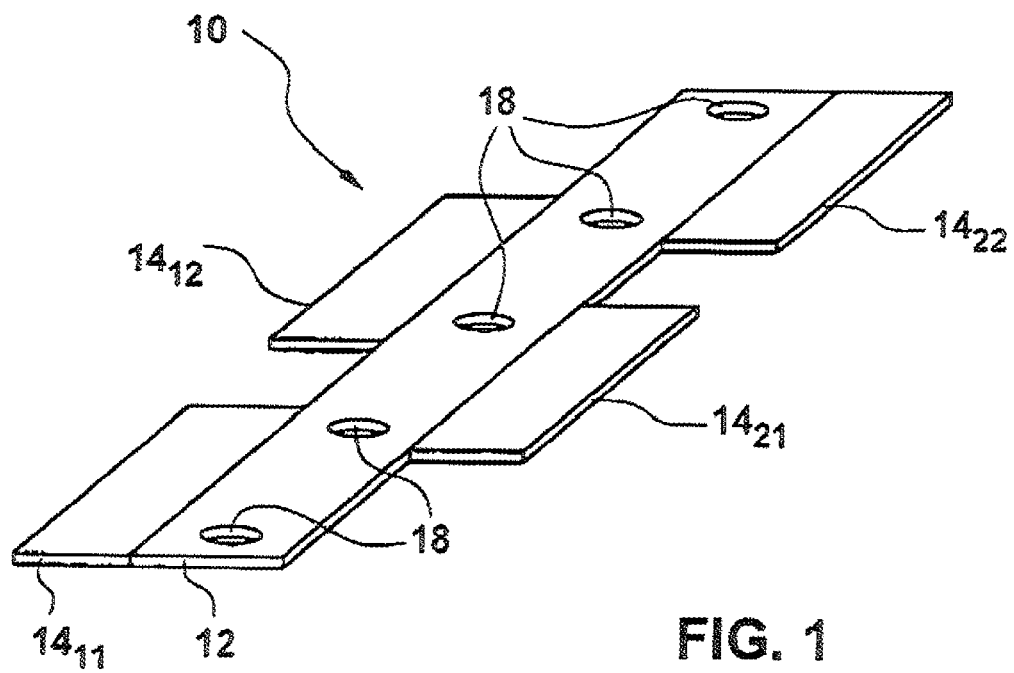
FIG. 1 shows an exemplary perspective view of a device for connecting battery cells according to an embodiment of the invention.

FIG. 1 shows an exemplary perspective view of a device 10 for connecting battery cells 30 according to an embodiment of the invention.

Figure 6:
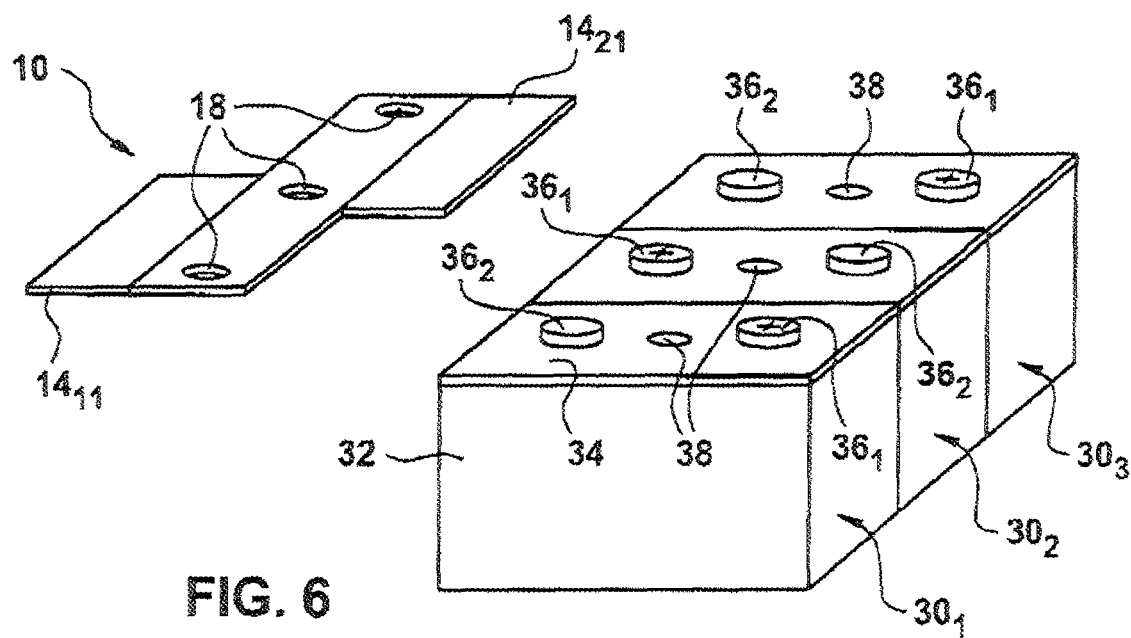
Figure 7:
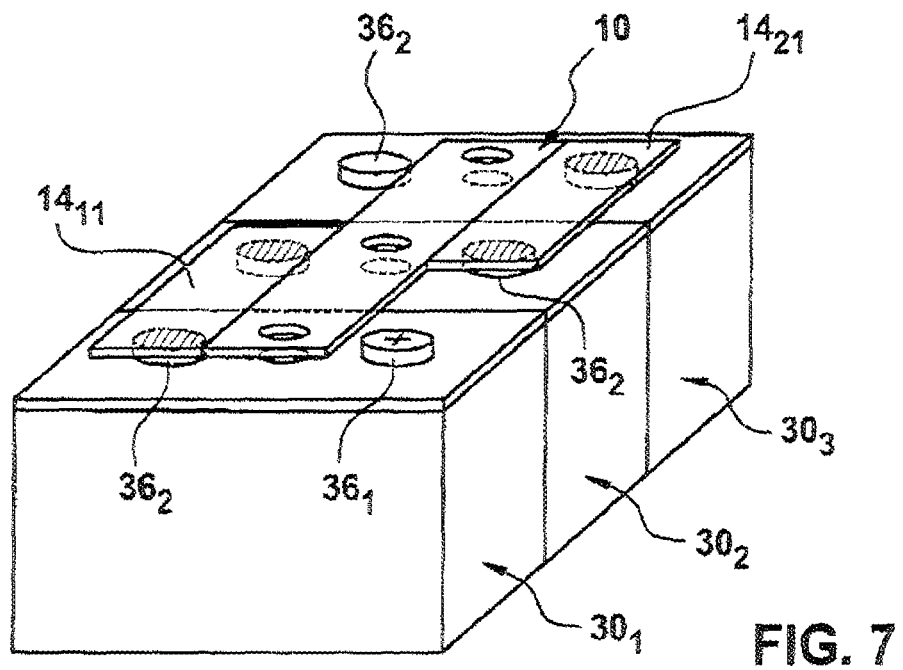

The device 10 comprises, with respect to FIGS. 6 and 7, a multiplicity of cell connectors $14_{11}, \ldots 14_{22}$ for electrically connecting terminals $36_1$, $36_2$ of the battery cells 30, and a carrier 12 for mechanically connecting the cell connectors $14_{11}, \ldots 14_{22}$ to one another.

The cell connectors $14_{11}, \ldots 14_{22}$ are embodied in the shape of a strip and comprise a metal, for example aluminum.

The carrier 12 is embodied in the shape of a strip and comprises plastic. The carrier 12 comprises, again with reference to FIGS. 6 and 7, a multiplicity of openings 18 for degassing the battery cells 30, the position of which corresponds to the position of burst valves 38 of the battery cells 30.

The cell connectors $14_{11}, \ldots 14_{22}$ are arranged offset with respect to one another in the manner of a comb on both sides along the carrier 12 and are attached to longitudinal sides of the carrier 12 for use of the battery cells 30 in accordance with the regulations. The cell connectors $14_{11}, \ldots 14_{22}$ and the carrier 12 are embodied in a flexible fashion.

Figure 2:
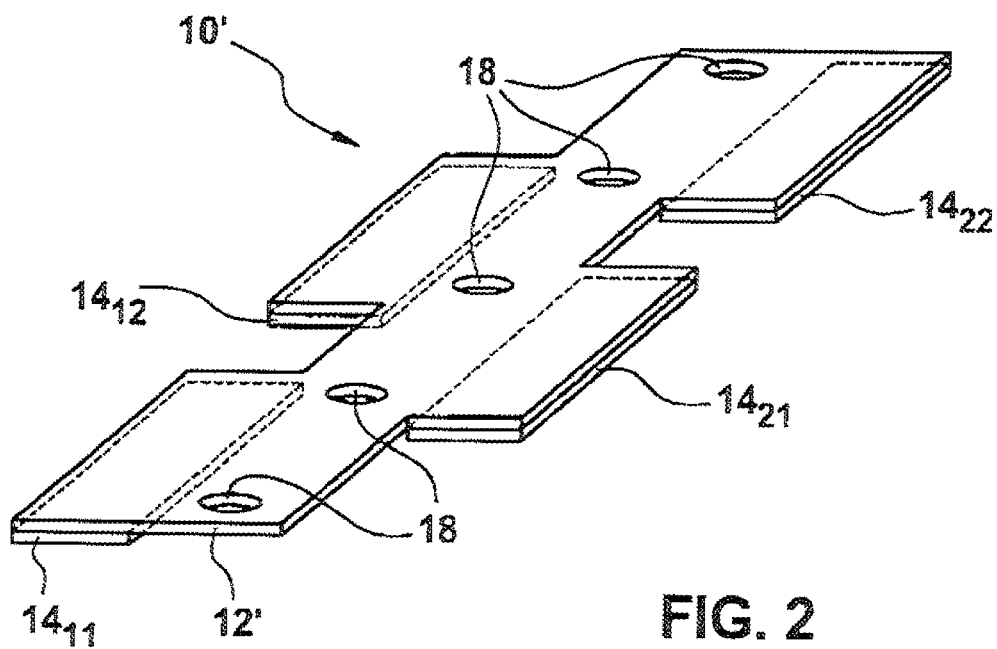
FIG. 2 shows an exemplary perspective view of a device for connecting battery cells according to another embodiment of the invention.
Figure 3:
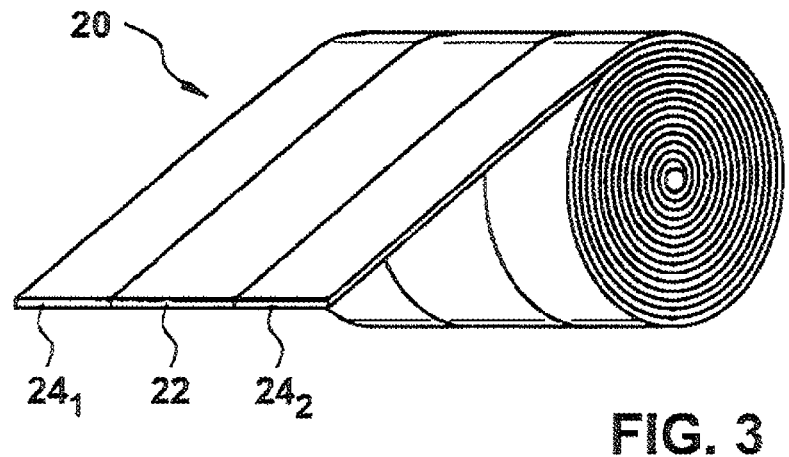
FIGS. 3 to 7 show exemplary steps of a method for connecting battery cells according to a further embodiment of the invention.

FIG. 2 shows an exemplary perspective view of a device 10' for connecting battery cells 30 according to another embodiment of the invention.

The device 10' comprises, with respect to FIGS. 6 and 7, a multiplicity of cell connectors $14_{11}, \ldots 14_{22}$ for electrically connecting terminals $36_1$, $36_2$ of the battery cells 30, and a carrier 12' for mechanically connecting the cell connectors $14_{11}, \ldots 14_{22}$ to one another.

In turn, the cell connectors $14_{11}, \ldots 14_{22}$ are embodied in the shape of a strip and comprise metal, for example aluminum.

The carrier 12' is embodied in the manner of a film and comprises plastic. The carrier 12' comprises, again with reference to FIGS. 6 and 7, a multiplicity of openings 18 for degassing the battery cells 30, the position of which corresponds in turn to the position of the burst valves 38 of the battery cells 30.

The cell connectors $14_{11}, \ldots 14_{22}$ are arranged in two rows under the carrier 12' offset with respect to one another in the manner of a comb, and are attached to an underside of the carrier 12' for use of the battery cells 30 in accordance with the regulations. The cell connectors $14_{11}, \ldots 14_{22}$ and the carrier 12 are embodied in a flexible fashion.

FIGS. 3 to 7 show exemplary steps of a method for connecting battery cells 30 according to a further embodiment of the invention.

The exemplary method comprises providing a composite material 20. The composite material 20 can be provided, for example, as material sold by the meter, material in a continuous form, material in a quasi-continuous form or, as shown by way of example in FIG. 3, rolled material.

The composite material 20 comprises a carrier section 22, a connector section $24_1$ and a further connector section $24_2$.

The carrier section 22 is embodied in the shape of a strip and comprises plastic. The carrier section 12 can already comprise openings 18 for degassing the battery cells 30.

The connector sections $24_1$, $24_2$ are embodied in the shape of a strip and comprise metal, for example aluminum. The connector sections $24_1$, $24_2$ can be perforated and/or comprise predetermined rupture points. Alternatively, the connector sections $24_1$, $24_2$ can comprise a multiplicity of individual elements such as connector arms or connector tongues. The carrier sections $24_1$, $24_2$ are arranged on both sides along the carrier section 22 and attached to longitudinal sides of the carrier section 22 for use of the battery cells 30 in accordance with the regulations. The connector sections $24_1$, $24_2$ and the carrier section 22 are embodied in a flexible fashion.

The exemplary method also comprises prefitting the device 10 for the connection of battery cells 30.

Figure 4:
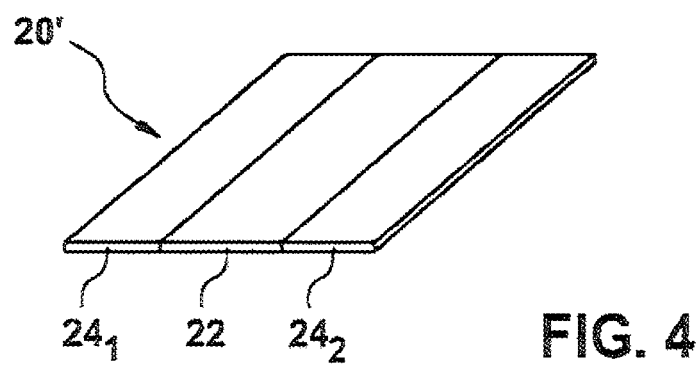

For this purpose, the method can, as shown by way of example in FIG. 4, firstly comprise cutting a composite material section 20' of the composite material 20 to length. The cutting to length can comprise, for example, severing such as sawing off, shearing off, cutting off, laser cutting or punching out.

Figure 5:
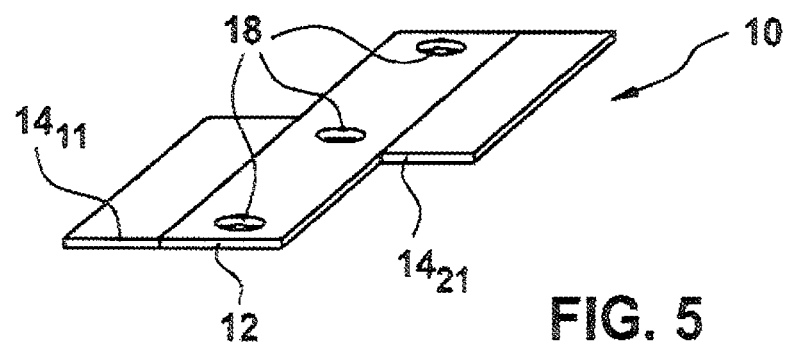

The method can subsequently comprise, as shown by way of example in FIG. 5, forming the cell connectors $14_{11}, \ldots 14_{22}$. In this context, the size and length of the cell connectors $14_{11}, \ldots 14_{22}$ corresponds to the battery cells 30 to be connected and to their terminals $36_1$, $36_2$. This formation can comprise, for example, completely severing such as sawing in, shearing off, melting off, cutting in, laser cutting or punching out the connector sections $24_1$, $24_2$. Alternatively, this formation can comprise, in each case, connecting, for example, welding a multiplicity of individual elements such as connector arms or connector tongues of the connector sections $24_1$, $24_2$.

The method can also comprise forming the openings 18 for the degassing of the battery cells 30 in the carrier 12. This formation can comprise, for example, cutting out or punching out. The steps of forming the cell connectors $14_{11}, \ldots 14_{22}$ and of forming the openings 18 can be carried out in the reverse order. Alternatively, the formation of the cell connectors $14_{11}, \ldots 14_{22}$ and the formation of the openings 18 can be carried out in one step.

FIG. 6 shows the device 10 and a multiplicity of battery cells $30_1, \ldots 30_3$. The battery cells $30_1, \ldots 30_3$ can, as shown by way of example in FIG. 6, be embodied as prismatic battery cells. The battery cells $30_1, \ldots 30_3$ can each comprise a battery housing lower part 32 and a battery housing upper part (battery cover) 34. The battery cells $30_1, \ldots 30_3$ can, as shown by way of example in FIG. 6, be arranged one next to the other along their lateral faces as a battery pack. The battery cells $30_1, \ldots 30_3$ each comprise electrical terminals (connections) $36_1, \ldots 36_2$. The terminals $36_1, \ldots 36_2$ can be arranged on upper sides of the battery cells $30_1, \ldots 30_3$ for use according to the regulations. The terminals $36_1, \ldots 36_2$ of the battery cells $30_1, \ldots 30_3$ can be connected to one another in such a way that the battery cells $30_1, \ldots 30_3$ are connected to one another electrically in series and/or in parallel.

The method also comprises positioning the device 10 on the battery cells $30_1, \ldots 30_3$. Positioning the device 10 on the battery cells $30_1, \ldots 30_3$ allows the multiplicity of cell connectors $14_{11}, \ldots 14_{22}$ to be positioned on the terminals $36_1, \ldots 36_2$ of the battery cells $30_1$, $30_3$.

The method finally comprises connecting or attaching the cell connectors $14_{11}, \ldots 14_{22}$ to the terminals $36_1, \ldots 36_2$ of the battery cells $30_1$, $30_3$. The attachment can comprise clipping, bonding, screwing, welding such as laser welding, friction welding, ultrasonic welding or resistance welding.

Another method for connecting battery cells 30 can comprise attaching the cell connectors $14_{11}, \ldots 14_{22}$ to the carrier 12. The attachment process can comprise, for example, clamping, bonding, welding, laser welding, friction welding, ultrasonic welding, injection molding, integrally injection molding or plugging.

The invention claimed is:

1. A device (10; 10') for connecting battery cells (30), the device comprising:
   a multiplicity of cell connectors (14) for electrically connecting terminals (36) of the battery cells (30), wherein each of the cell connectors (14) is in the form of a strip, and
   a carrier (12; 12') for mechanically connecting the cell connectors (14) to one another, wherein the carrier (12) is plastic and is in the form of a strip, and wherein an entire length of each of the cell connectors (14) is directly attached to the carrier (12; 12'), wherein the cell connectors (14) are rectangular cuboids and each has a plurality of planar faces including first opposing major faces, first opposing edge faces, and second opposing edge faces, wherein the first opposing edge faces have a smaller surface area than the first opposing major faces and a larger surface area than the second opposing edge faces, wherein the cell connectors (14) are arranged along the carrier (12; 12') such that one of the first opposing edge faces abuts an edge of the carrier (12; 12').

2. The device (10; 10') according to claim 1, wherein:
   the cell connectors (14) comprise metal, aluminum or copper.

3. The device (10; 10') according to claim 1, also comprising:
   a multiplicity of lines which are arranged in the carrier (12; 12'), for detecting voltage measured values or current measured values of the battery cells (30).

4. The device (10; 10') according to claim 1, wherein the cell connectors (14) are rectangular cuboids and each has a plurality of planar faces including first opposing major faces, first opposing edge faces, and second opposing edge faces, wherein the first opposing major faces have a larger surface area than the first opposing edge faces and the second opposing edge faces, and wherein the cell connectors (14) are arranged along the carrier (12; 12') such that one of the first opposing major faces abuts a face of the carrier (12; 12').

5. The device (10; 10') according to claim 1, wherein the cell connectors (14) are embodied in the manner of a ribbon, in the manner of a plate, in the manner of a film, in the manner of a mesh, or in the manner of a network.

6. The device (10; 10') according to claim 1, wherein the cell connectors (14) have a thickness of 0.01 mm to 8 mm, of 0.1 mm to 0.8 mm or 0.5 mm.

7. The device (10; 10') according to claim 1, wherein the cell connectors (14) are embodied in a flexible fashion.

8. The device (10; 10') according to claim 1, wherein the carrier (12; 12') is embodied in a manner of a ribbon, or in the manner of a film.

9. The device (10; 10') according to claim 1, wherein the carrier (12; 12') has a thickness of 0.01 mm to 0.8 mm, of 0.1 mm to 0.8 mm or 0.5 mm.

10. The device (10; 10') according to claim 1, wherein the carrier (12; 12') is embodied in a flexible fashion.

11. The device (10; 10') according to claim 1, wherein the device (10; 10') is embodied as a composite material (20), comprising a carrier section (22) and a connector section (24) or a multiplicity of connector sections (24), wherein the connector section (24) or the connector sections (24) are pre-fitted to the cell connectors (14).

12. The device (10; 10') according to claim 1, wherein the carrier (12; 12') comprises a multiplicity of openings (18) for degassing the battery cells (30), wherein the openings (18) are cut or punched out of the carrier (12; 12').

13. The device (10; 10') according to claim 1, also comprising a multiplicity of sensors which are arranged in the carrier (12; 12') for detecting measured values of the battery cell (30).

14. The device (10; 10') according to claim 1, also comprising a degassing duct which is connected to the multiplicity of openings (18) and is formed in the carrier (12; 12') in order to degas the battery cells (30).

15. A battery pack, comprising:
a multiplicity of battery cells (30), and
a device (10; 10') connecting the battery cells (30), the device comprising a multiplicity of cell connectors (14) electrically connecting terminals (36) of the battery cells (30), wherein each of the cell connectors (14) is in the form of a strip, and
a carrier (12; 12') mechanically connecting the cell connectors (14) to one another, wherein the carrier (12) is plastic and is in the form of a strip, and wherein an entire length of each of the cell connectors (14) is directly attached to the carrier (12; 12'), wherein the cell connectors (14) are rectangular cuboids and each has a plurality of planar faces including first opposing major faces, first opposing edge faces, and second opposing edge faces, wherein the first opposing edge faces have a smaller surface area than the first opposing major faces and a larger surface area than the second opposing edge faces, wherein the cell connectors (14) are arranged along the carrier (12; 12') such that one of the first opposing edge faces abuts an edge of the carrier (12; 12').

* * * * *